United States Patent [19]
Leite et al.

[11] Patent Number: 5,499,314
[45] Date of Patent: *Mar. 12, 1996

[54] SHOCK RESISTANT OPTIC FIBER ROTARY SPLICE HOLDING DEVICE

[76] Inventors: Sara M. Leite, P.O. Box 160, Dahlgren, Va. 22448; Daniel D. Thomas, 6100 Igo Rd., King George, Va. 22485; Gair D. Brown, P.O. Box 56, Dahlgren, Va. 22448; Alan Schwarting, Rt. 1, Box 315, Warsaw, Va. 22572

[*] Notice: The term of this patent shall not extend beyond the expiration date of Pat. No. 5,422,974.

[21] Appl. No.: 345,716

[22] Filed: Nov. 22, 1994

[51] Int. Cl.⁶ .................................................. G02B 6/38
[52] U.S. Cl. .................... 385/135; 385/52; 385/95; 385/136
[58] Field of Search .................. 385/51, 52, 59, 385/60, 72, 95, 97, 99, 134–137

[56] References Cited

U.S. PATENT DOCUMENTS

| | | | |
|---|---|---|---|
| 4,687,289 | 8/1987 | DeSanti | 385/135 |
| 4,927,227 | 5/1990 | Bensel, III et al. | 385/135 |
| 5,097,529 | 3/1992 | Cobb et al. | 385/135 |
| 5,208,893 | 5/1993 | McCall et al. | 385/135 |
| 5,218,664 | 6/1993 | O'Neill et al. | 385/135 |
| 5,313,546 | 5/1994 | Toffetti | 385/135 |
| 5,347,606 | 9/1994 | Johansen | 385/95 |
| 5,367,594 | 11/1994 | Essert et al. | 385/72 X |
| 5,422,974 | 6/1995 | Brown et al. | 385/135 |

*Primary Examiner*—John D. Lee

[57] ABSTRACT

Rotary mechanical splices between axially aligned optic fibers are seated in axial confinement within bays indented into the shock absorbing body of a holding tray. A retention lid, positioned on the tray covers the splice seating bays and guide slots extending therefrom within which the optic fibers are received to provide cushioned confinement for the splices and resist relative bending of the fibers.

8 Claims, 2 Drawing Sheets

SHOCK RESISTANT OPTIC FIBER ROTARY SPLICE HOLDING DEVICE

BACKGROUND OF THE INVENTION

Protective trays and other devices for holding splices between optic fibers are already well known in the art. Generally, the splices form joints between optic fibers utilizing fusing and/or bonding in combination with precision-machined alignment structure. Such splicing techniques often minimized the protective measures deemed necessary for the splice holding device to maintain the integrity of the fiber splices in any contemplated installational environment.

A known splicing technique which does not involve precision-machined fiber alignment structure, is utilized in a rotary mechanical splice suitable for connecting single-mode and multi-mode fibers. The optical losses associated with such rotary splices is nevertheless minimized because of its rotatably adjusted fiber alignment capability, making it however susceptible to misalignment disturbances under harsh shock producing environments.

It is therefore an important object of the present invention to provide a novel protective enclosure device for rotary splices between optic fibers that is sufficiently shock resistant in order to avoid high optical fiber loss due to splice misalignment under harsh environmental conditions, without reliance on high cost alignment structure.

SUMMARY OF THE INVENTION

In accordance with the present invention rotary mechanical splices, through which optical fibers are aligned and held in abutting contact with each other, are respectively confined axially within appropriately dimensioned bays in a shock absorbing body of a holding tray also having fiber slots formed therein receiving the optical fibers extending from the splices to resist relative bending of such fibers. A retention lid also having a shock absorbing body, is positioned on the holding tray to cover the splice seting bays and the fiber receiving slots to enhance cushioned confinement of the splices and the fibers and resist displacement thereof relative to the tray and lid assembly.

BRIEF DESCRIPTION OF DRAWING FIGURES

A more complete appreciation of the invention and many of its attendant advantages thereof will be readily appreciated as the same becomes better understood by reference to the following detailed description when considered in connection with the accompanying drawings wherein.

Figure 1:
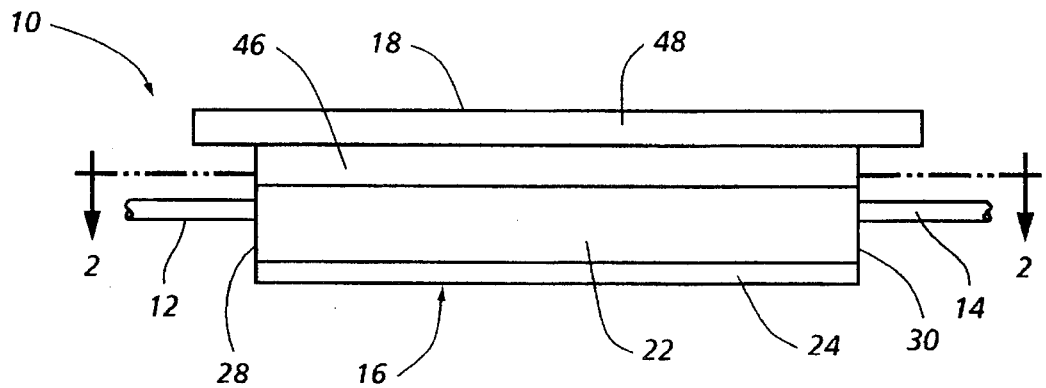
FIG. 1 is a side elevation view of an optic fiber splice holding device, in accordance with one embodiment of the invention.
Figure 2:
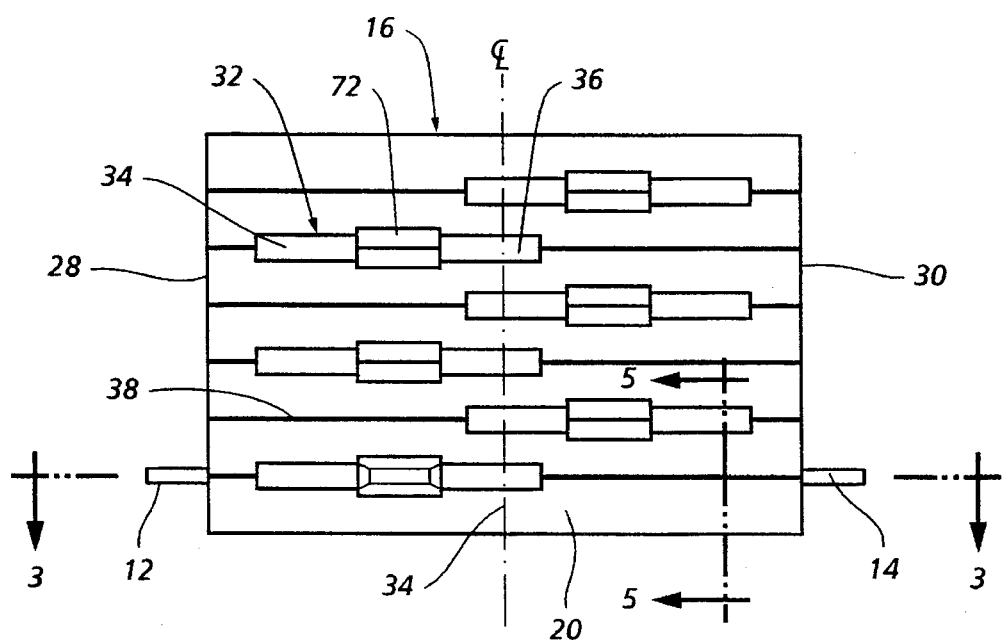
FIG. 2 is a top section view taken substantially through a plane indicated by section line 2—2 in FIG. 1.
Figure 3:
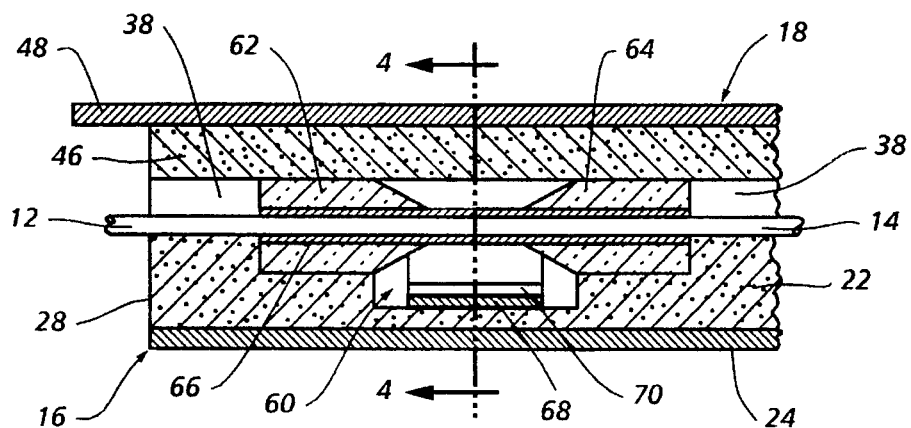
FIG. 3 is a partial side section view of the splice holding device, taken substantially through a plane indicated by section line 3—3 in FIG. 2.
Figure 4:
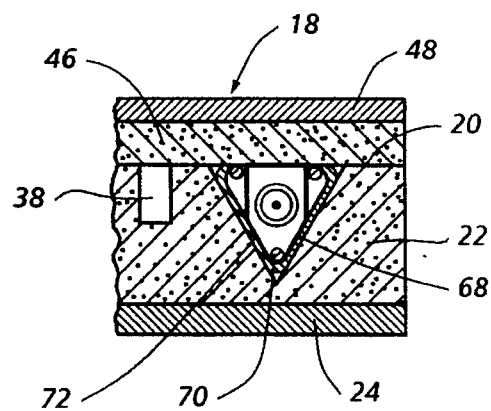
Figure 5:
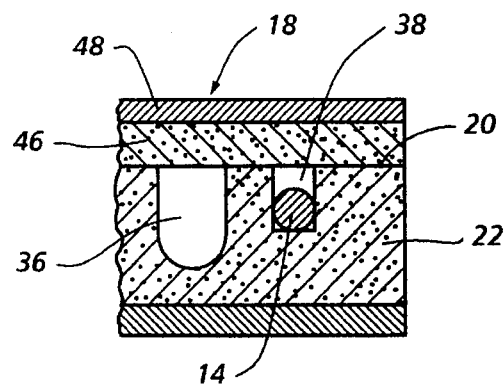

FIG. 4 is a partial longitudinal section view taken substantially through a plane indicated by section line 4—4 in FIG. 3, depicting a typical splice of the rotary mechanical type seated within the splice holding device shown in FIGS. 1 and 2; and FIG. 5 is a partial side section view taken substantially through a plane indicated by section lines 5—5 in FIG. 2.

DETAILED DESCRIPTION OF PREFERRED EMBODIMENT

Referring now to the drawing in detail, FIGS. 1 and 2 illustrate a protective enclosure device, generally referred to by reference numeral 10, within which a splice between a pair of optical fibers 12 and 14 is protectively retained. As many as six of such splices may be accommodated within the enclosure device 10 in the illustrated embodiment. The enclosure device 10 comprises basically a holding tray generally referred to by reference numeral 16 and a retention lid 18. The tray and lid may either be made of one folded piece or separate parts which may be interconnected by a hinge.

The holding tray 16 as shown in FIGS. 1 and 2 is generally rectangular in shape and has an upper planar surface 20 on a body 22 made of shock absorbing material such as foam. The lid 18 is supported on such surface 20 of the tray covering indentations formed therein in order to accommodate organization of a rotary mechanical splice between the optical fibers 12 and 14 and firm seating thereof so as to resist shock force induced disturbances and prevent bending of the fibers. Optical losses are thereby reduced by the device 10 which otherwise protects the splices retained therein as hereinafter explained in detail.

According to one embodiment of the invention as shown in FIGS. 2 and 3, the foam body 22 of the tray has a rigid backing 24 secured thereto by bonding. The surface 20 of the foam body 22 has six elongated indentations or bays 32 molded therein. Each bay 32 is spaced longitudinally from one of the opposite longitudinal ends 28 and 30 of the tray, and extends beyond the centerline of the tray body. Fiber guide slots 38 extend from both ends of each bay 32 to the ends 28 and 30 of the tray.

The lid 18 also has a foam body 46 covering the surface 20 of the tray. A rigid backing 48 may also be provided for the lid 18 extending longitudinally beyond the foam body 46, according to one embodiment as shown. The splices seated in the bays 32 of the tray are held therein by the lid.

Referring now to FIGS. 3 and 4 in particular, a rotary splice 60 is seated within one of the bays 32, from which the optical fibers 12 and 14 extend. This type of splice 60, generally known in the art, includes two transparent ferrules 62 and 64 respectively positioning tubular coatings 66 for the fibers within a berillium-bronze alignment clip 68 having three rods 70 as shown. The ferrules 62 and 64 are secured to each other by the clip 68 after relative rotational adjustment thereof centering the fibers in their aligned positions in contact with each other. The alignment clip 68 is seated within a cross-sectionally triangular portion 72 of the bay 32 as more clearly seen in FIG. 4, located intermediate opposite end portions 34 and 36 as more clearly seen in FIG. 5, to thereby accommodate reception of the rotary type of splice 60 and adjustment of the ferrules 62 and 64 seated within portions 34 and 36 of the bay. In such adjusted position of the splice 60, the optical fibers 12 and 14 are seated in longitudinal alignment with the splice within the fiber slots 38 and retained therein by the lid as more clearly seen in FIG. 3. Microbending of the fibers 12 and 14 relative to the seated splice is thereby resisted.

It will be apparent from the foregoing description that as many as six rotary mechanical splices 60 between pairs of fibers 12 and 14 may be organized and properly seated within the bays 32, confined in their rotationally adjusted positions with the aligned fibers received in the fiber slots 38 to prevent relative bending. The foam body 22 of the tray 16 under and around the splices 60 seated within the bays 32 provide a cushioned or damped environment without the high cost of a machined metal type tray. Lateral movement of the alignment clips 68 of the splices within the bays 32 is also prevented by the undersurface 46 of the lid 16 coverings the bays 32 and fiber slots 38 to prevent displacement of the fibers therefrom under shock forces.

Obviously other modifications and variations of the present invention may be possible in light of the foregoing teachings. It is therefore to be understood that within the scope of the appended claims the invention may be practiced otherwise than as specifically described.

What is claimed is:

1. A protective holding device for a splice from which optical fibers extend, comprising: a tray and a retention lid, said tray having indentation means formed therein for cushioned confinement of the splice and guide means receiving the optical fibers extending from the splice while seated in the indentation means for resisting relative bending of the optical fibers.

2. The combination of claim 1 wherein said tray comprises: a shock absorbing body within which the indentation means and the guide means are formed.

3. The combination of claim 2 wherein said guide means comprises fiber slots formed in the shock absorbing body extending from the indentation means in axial alignment therewith.

4. The combination of claim 3 wherein the indentation means comprises an elongated bay having an intermediate portion of triangular cross-section, said splice having an alignment clip axially confined within said intermediate portion of the bay.

5. The combination of claim 3 wherein said retention lid includes a foam cover in contact with the shock absorbing body of the tray, the foam cover overlying the indentation means and the fiber slots.

6. The combination of claim 2 wherein said tray comprises: a foam body within which the indentation means and the guide means are formed and a rigid backing to which the foam body is secured.

7. The combination of claim 1 wherein the indentation means comprises an elongated bay having an intermediate portion of triangular cross-section, said splice having an alignment clip axially confined within said intermediate portion of the bay.

8. The combination of claim 1 wherein said splice has an alignment clip confined within an intermediate portion of said indentation means.

\* \* \* \* \*